Patented Oct. 14, 1941

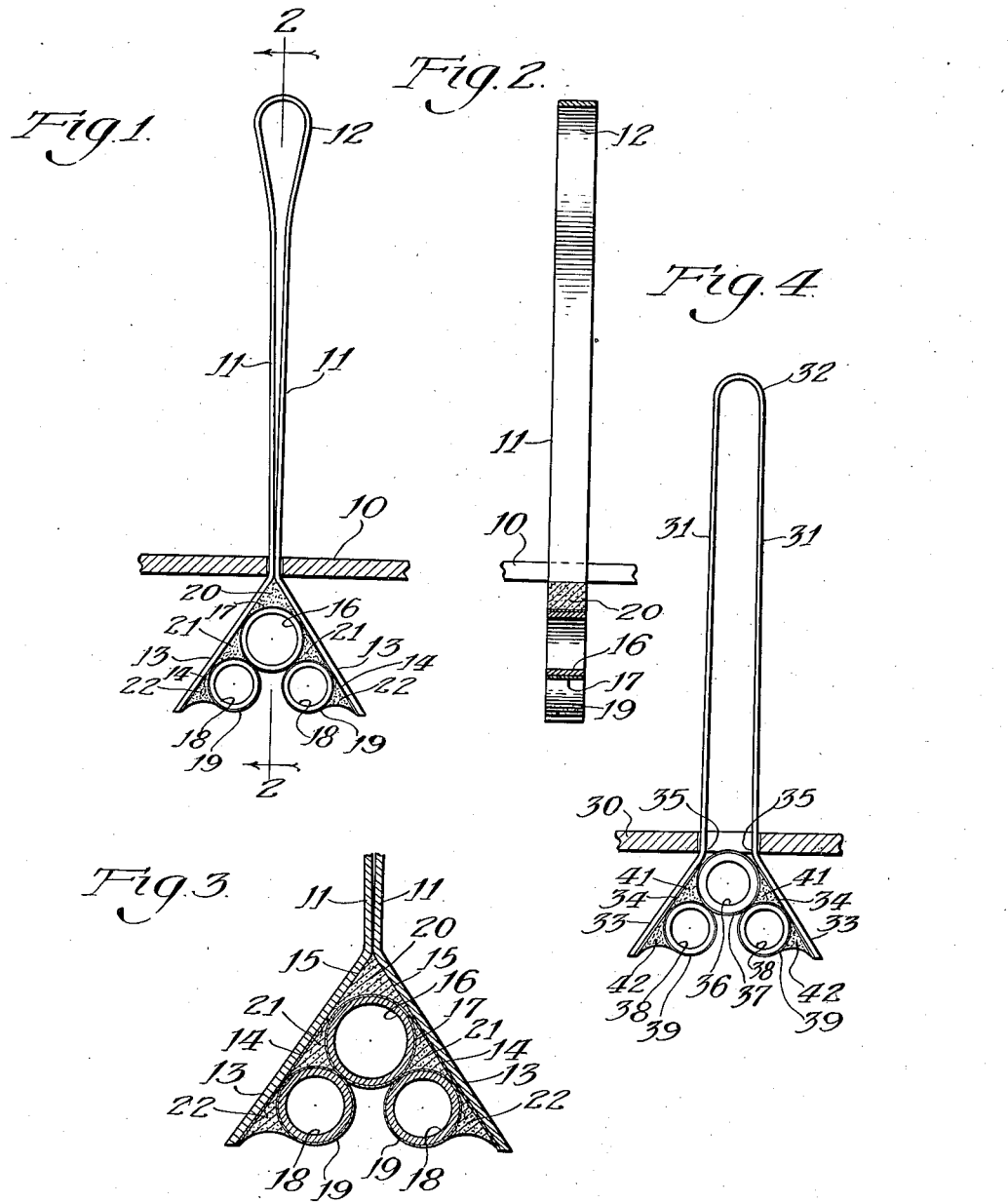

2,258,865

UNITED STATES PATENT OFFICE 2,258,865

THERMORESPONSIVE RESTRAINING DEVICE

William L. Roessner, La Grange, Ill., assignor to Bertha MacGregor Roessner, trustee, also known as Bertha L. MacGregor Application October 25, 1940, Serial No. 362,722

5 Claims. (Cl. 169—42)

This invention relates to thermo-responsive restraining devices, and particularly to devices of the character described which are designed normally to restrain powerful mechanisms and to release the same very quickly when subjected to heat of predetermined temperature.

The thermo-responsive restraining devices of my invention are improvements on the type of fusible links shown in my United States Patents Nos. 1,875,661 and 1,894,425. As therein explained, this type of restraining device employs fusible alloy between spread apart arms of a link in such manner that the alloy will be subjected to compressive strains as distinguished from tensional and tortional strains, and the compressive strains are resisted by hollow metal members of greater compressive strength and higher fusing point than the fusible alloy in which they are embodied.

The thermo-responsive devices herein shown and described are also of the said compressive type but are especially designed to obtain extremely speedy release under certain temperature conditions without impairing the restraining power and dependability of the devices.

The main object of this invention is to produce thermo-responsive devices which will release the mechanism being controlled thereby in a very short period of time, i. e. a few seconds, after the alloy has been subjected to heat of predetermined temperature, and which, nevertheless, are capable of normally restraining or holding inoperative mechanisms much more powerful than any restrained by other types of fusible links.

These objects are accomplished by employing a minimum quantity of alloy between the spread apart link arms and by disposing the alloy in such manner that the arms are reinforced and held in spaced relation or restraining position until subjected to a predetermined degree of heat, the alloy being made to adhere to only part of the surface of each arm and to be so disposed between said arms that it is instantly melted by heat of certain predetermined temperature, thereby permitting instantaneous release of the controlled mechanism.

In the drawing:

Fig. 1 is an elevational view of a thermo-responsive restraining device embodying my invention.

Fig. 2 is a side elevational view of the same.

Fig. 3 is a sectional view, on an enlarged scale, of part of the device shown in Fig. 1.

Fig. 4 is an elevational view, similar to Fig. 1, of a modified form of construction.

In that embodiment of the invention shown in Figs. 1, 2 and 3, 10 indicates a slotted support through which extend the substantially parallel members 11, 11 of the fusible link. The link comprises a narrow strip of brass or easily deformable metal bent to form members 11 joined at one end by the loop 12 and having at the other end spread apart arms 13, 13. The inner surfaces of the arms 13, between their ends and a point removed from the apex of the triangle formed by said arms, are roughened to increase the contact area, and then coated with fusible alloy, as indicated by the lines 14, 14. The portion 15 of each of the arm surfaces between the inner end of the coating 14 and the members 11 is left untreated and uncoated.

A tubular member 16 having an alloy coating 17 and two tubular members 18, 18 having an alloy coating 19 are placed between the arms 13 in the positions shown and fusible alloy is put into the small triangular spaces as indicated at 20, 21, 21 and 22, 22. The alloy in the spaces 21, 21, 22, 22 becomes an integral part of the coating 14 which adheres to portions of the arms 13, 13, whereas the alloy 20 remains a mass unjoined to the regions 15, 15 of the arms.

The mechanism to be restrained or the weight to be suspended or opposed (not shown) is secured to the loop 12. In my United States Patents Nos. 2,218,855 and 2,218,857, I have shown how fusible links of the character described are employed in fire extinguishers to restrain grenade crashing means.

In the modified form of construction shown in Fig. 4, 30 indicates a slotted support through which extend the parallel members 31, 31 of the fusible link. This link differs from that shown in Figs. 1-3 in that the parallel members are spaced apart to a greater extent than are the members 11, 11. The fusible link is also made of a narrow strip of brass or other easily deformable metal, the members 31 being joined at one end by the loop 32 and having at the other end spread apart, inclined arms 33, 33. The inner surfaces of the arms 33, from their free ends to a point somewhat removed from the members 31, are roughened to increase the contact area and then coated with fusible alloy as indicated by the lines 34, 34. The portion 35 of each of the arm surfaces adjacent the end of the coating 34 is left untreated and uncoated.

A tubular member 36 having an alloy coating 37 and two tubular members 38, 38 having an alloy coating 39 are placed between the arms 33 in the positions shown and fusible alloy is filled into the small triangular spaces indicated at 41, 41 and 42, 42. The alloy in the said spaces intimately adheres to or becomes a part of the coating 34 on the arms 33.

The tubular member 36 preferably is made of greater thickness than the tubular members 38 because that portion of the restraining device in which said tubular member 36 is located bears the greatest strain and is subjected to compression by bearing against the slotted support 30 when the thermo-responsive restraining device is employed in its intended manner, as for example, for the purposes shown in my aforesaid United States Letters Patent Nos. 2,218,855 and 2,218,857.

In the fusible links shown in my prior patents, the triangularly shaped spacers of fusible alloy were made to adhere intimately to the spread apart arms throughout their lengths, but I have found that by connecting the spacers of fusible alloy only to part of the arm surfaces and by leaving the apex region free, speedier release is obtained. That is, the fact that the alloy in the triangular space 20 of the device shown in Figs. 1-3, inclusive, does not adhere to the inner surfaces of the arms 13 aids materially in obtaining quick release of the thermo-responsive material from the arms 13 when the device is subjected to a predetermined temperature.

The further fact that the outer central area between the tubular members 18, 18 is substantially free of alloy also speeds the release because heat is enabled to pass quickly to the alloy 21, 21 and 22, 22 which holds the tubular members in the position wherein they prevent collapsing of the arms 13. Likewise, the tubular members 36, 38 and 38 and the alloy 41, 41 42 and 42 in the construction shown in Fig. 4 are so arranged that the parts are quickly accessible to heat, a minimum of alloy being used to retain them in position, but the construction is such that the arms 33 are reinforced and spaced apart and maintained in said restraining position under substantial stresses until affected by a predetermined degree of heat.

Changes may be made in details of construction without departing from the scope of my invention.

I claim:

1. A thermo-responsive restraining device comprising a link member having two substantially parallel flexible arms, the ends of the arms being spread apart, and a spacer formed from readily fusible solder located between said spread apart ends and connected along only a portion of its side edges to the inner surfaces of said ends, that portion of the spacer nearest the parallel arms of the link being not connected to said spread apart ends and therefore free to pass from its position between said ends when the adhering portion of the spacer has melted under influence of heat.

2. A thermo-responsive restraining device comprising a link member having two substantially parallel flexible arms, the ends of the arms being spread apart and outwardly inclined, and a substantially triangularly shaped spacer formed from readily fusible solder, said spacer being connected to the inner surfaces of said inclined arms between the outer ends of said arms and a point removed from said parallel portions of the arms, the apex region of said spacer being not connected to said inclined arms and therefore free to pass from its position between said inclined arms when the arm-adhering portion of the spacer has melted under influence of heat.

3. A thermo-responsive restraining device comprising a link member having two substantially parallel flexible arms, the ends of the arms being spread apart and outwardly inclined, a coating of fusible alloy adheringly applied to the inner surfaces of the outer end portions of said inclined arms, and a spacer of readily fusible solder located between said inclined arms and connected only to the coated portions of said inclined arms, that portion of the spacer located between uncoated portions of the inclined arms being not connected to said arms and therefore free to pass from its position between said inclined arms when the arm-adhering portion of the spacer has melted under influence of heat.

4. A thermo-responsive restraining device comprising a link member having two substantially parallel flexible arms, the ends of the arms being spread apart and outwardly inclined, a spacer of readily fusible solder between said inclined arms, and a plurality of hollow tubular members in the spacer, the tubular members being located adjacent the inclined arms and connected to said arms by said solder, the tubular members nearest the base of said spacer being spaced apart from each other and said space being substantially free from solder, the said spacer being connected along only a portion of its side edges to the inner surfaces of said inclined arms, that portion of the spacer nearest the parallel arms of the link being not connected to said inclined arms and therefore free to pass from its position between said inclined arms when the arm-adhering portion of the spacer has melted under influence of heat.

5. A thermo-responsive restraining device comprising a link member having two substantially parallel flexible arms, the ends of the arms being spread apart, a spacer formed from readily fusible solder located between said spread apart ends and connected along only a portion of its side edges to the inner surfaces of said ends, that portion of the spacer nearest the parallel arms of the link being not connected to said spread apart ends and therefore free to pass from its position between said ends when the adhering portion of the spacer has melted under influence of heat, and a plurality of hollow tubular members in the spacer, the tubular members removed from the apex of the spacer being located at opposite sides of the spacer closely adjacent the spread apart ends of the arms in reinforcing relation and heat conveying relation to said ends.

WILLIAM L. ROESSNER.